Figure 1:
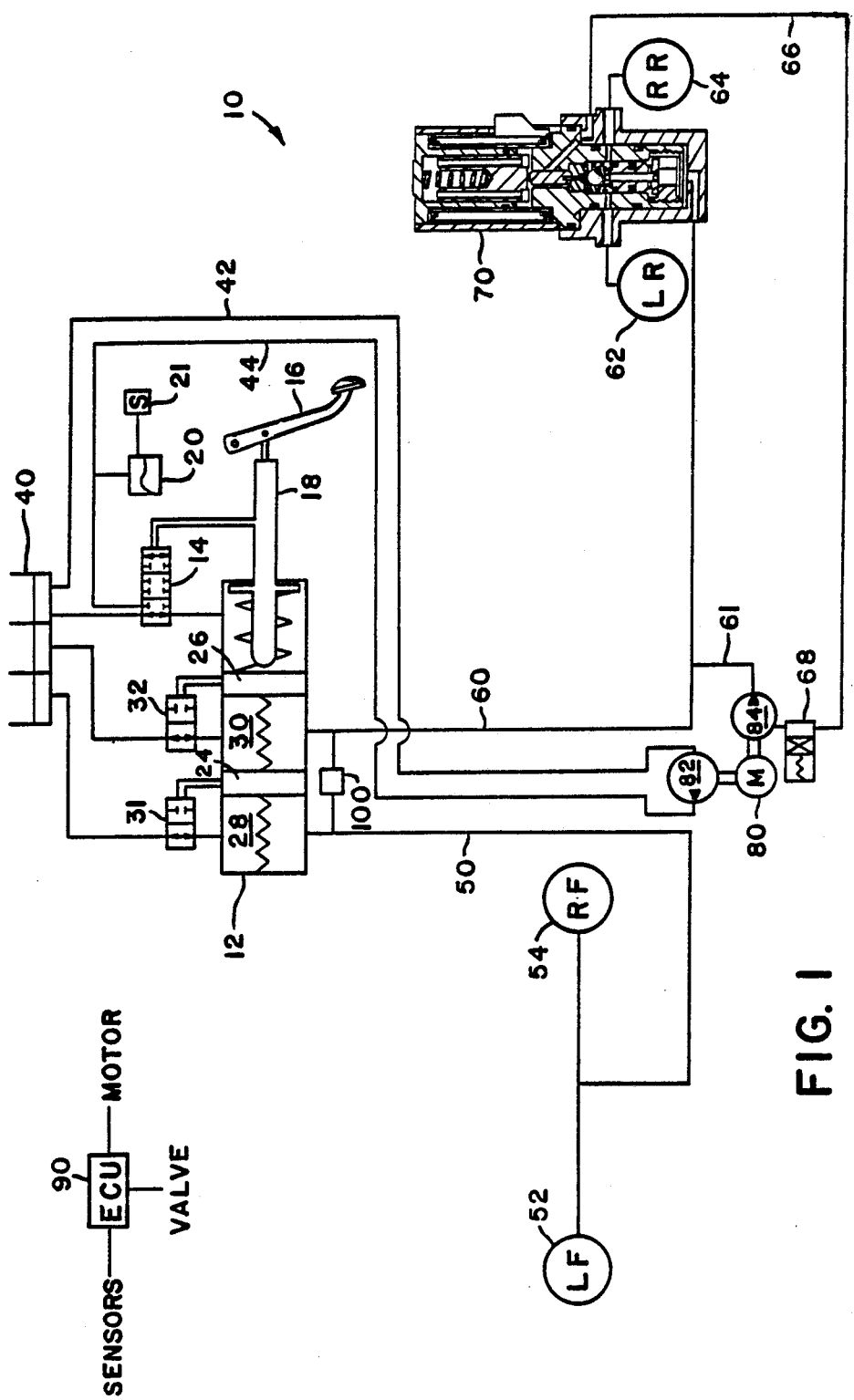

United States Patent [19]

Brown, Jr.

[11] Patent Number: 4,898,432
[45] Date of Patent: Feb. 6, 1990

[54] ADAPTIVE BRAKING SYSTEM HAVING HYDRAULIC BOOSTER AND PUMP-BACK SYSTEM

[75] Inventor: Arthur K. Brown, Jr., South Bend, Ind.

[73] Assignee: Allied-Signal, Inc., Morristown, N.J.

[21] Appl. No.: 260,531

[22] Filed: Oct. 20, 1988

[51] Int. Cl.$^4$ ............................................. B60T 8/44
[52] U.S. Cl. ...................................... 303/114; 303/92; 303/116
[58] Field of Search .................. 303/92, 100, 110, 111, 303/113, 114, 115, 116, 119

[56] References Cited

U.S. PATENT DOCUMENTS

| | | | |
|---|---|---|---|
| 4,418,966 | 12/1983 | Hattwig | 303/100 |
| 4,460,220 | 7/1984 | Petersen | 303/119 |
| 4,477,125 | 10/1984 | Belart, et al. | 303/116 |
| 4,492,413 | 1/1985 | Belart et al. | 303/92 |
| 4,678,243 | 7/1987 | Leiber | 303/114 |
| 4,708,404 | 11/1987 | Seibert et al. | 303/114 |
| 4,715,667 | 12/1987 | Otsuki et al. | 303/119 |
| 4,726,630 | 2/1988 | Krohn et al. | 303/119 |
| 4,758,054 | 7/1988 | Brown | 303/114 |
| 4,759,591 | 7/1988 | Reinartz et al. | 303/116 |
| 4,778,226 | 10/1988 | Brown | 303/116 |
| 4,800,289 | 1/1989 | Adachi et al. | 303/116 X |

*Primary Examiner*—Duane A. Reger
*Attorney, Agent, or Firm*—Larry J. Palguta; Ken C. Decker

[57] ABSTRACT

The adaptive braking system (10, 110, 210, 310, 410) provides for the combination of a replenishment type anti-skid system having a full power hydraulic brake booster (12) with a pump (80) providing pressure via an accumulator (20) to the booster (12) and a pump-back system wherein the pump (80) communicates make-up pressure to the respective electrically actuated valve mechanisms (70, 170) and brakes when control of the brakes is effected by an electronic control mechanism (90) in response to an incipient skidding condition.

15 Claims, 6 Drawing Sheets

ADAPTIVE BRAKING SYSTEM HAVING HYDRAULIC BOOSTER AND PUMP-BACK SYSTEM

The present invention relates generally to an adaptive braking system for axle-by-axle and cross-split braking systems, and in particular to an adaptive braking system utilizing a replenishment-type full-power hydraulic booster in combination with a pump-back type of system.

Many adaptive braking systems for automotive vehicles have been provided previously. Some adaptive braking system utilize a replenishment-type of anti-skid system which utilizes a full-power hydraulic brake booster wherein the boost pressure from the hydraulic brake booster is used not only for normal braking but for anti-skid brake modulation. When fluid pressure is decayed away from the brakes during anti-skid operation, the pressure is sent back to the reservoir. Other adaptive braking sytems comprise pump-back systems which utilize a vacuum booster and a master cylinder in combination with a pump that communicates pressure to the respective wheel brakes via electrically actuated value mechanisms which operate to provide anti-skid brake modulation. The pump does not communicate pressure to the master cylinder, whereas in the above-described replenishment system the full-power hydraulic brake booster receives its pressure from a pump via an accumulator.

It is desirable to provide an adaptive braking system which utilizes a full-power hydraulic brake booster while also including a pump-back system for providing make-up fluid pressure to the electrically actuated valve mechanisms which effect anti-skid pressure modulation. The provision of such an anti-skid adaptive braking system enables the system to be adapted for cross-split and axle-by-axle systems with one to four channels, with minimal modification required in order to switch from one system to another.

The present invention comprises an adaptive braking system for a vehicle having a pair of axles with a pair of wheels and brakes on each axle, said system including a hydraulic brake booster for actuation by a vehicle operator, said hydraulic brake booster having first and second chambers in which hydraulic braking pressure is developed when a brake application is effected by the vehicle operator, a first braking circuit hydraulically communicating said first chamber with at least one brake controlling a wheel on one of said axles, a second braking circuit hydraulically communicating said second chamber with at least one brake controlling a wheel of the other axle, first electrically actuated valve means in said second braking circuit and for controlling hydraulic communication with the respective brake, control means responsive to rotation of the wheels and for controlling said one brake of the other axles by operating said electrically actuated valve means when an incipient skidding condition is detected, and pump means for supplying hydraulic pressure to said booster and for supplying make-up pressure to said one brake of the other axle when control of the brake is effected by said control means in response to said incipient skidding condition.

Figure 2:
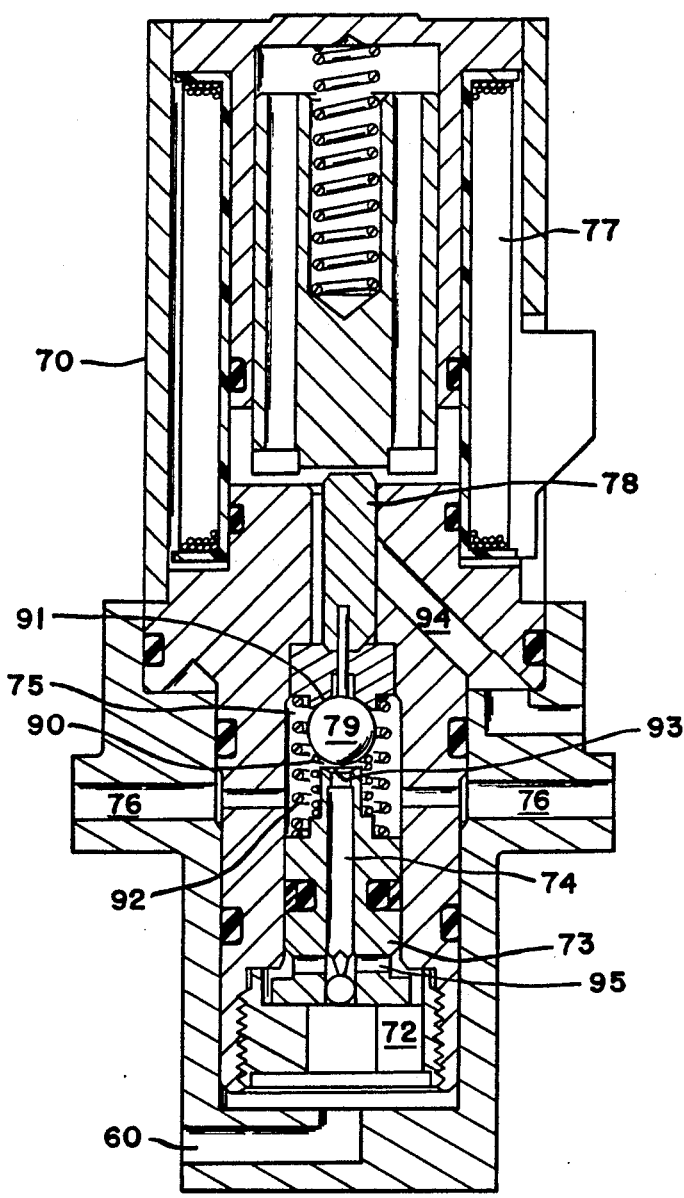
Figure 3:
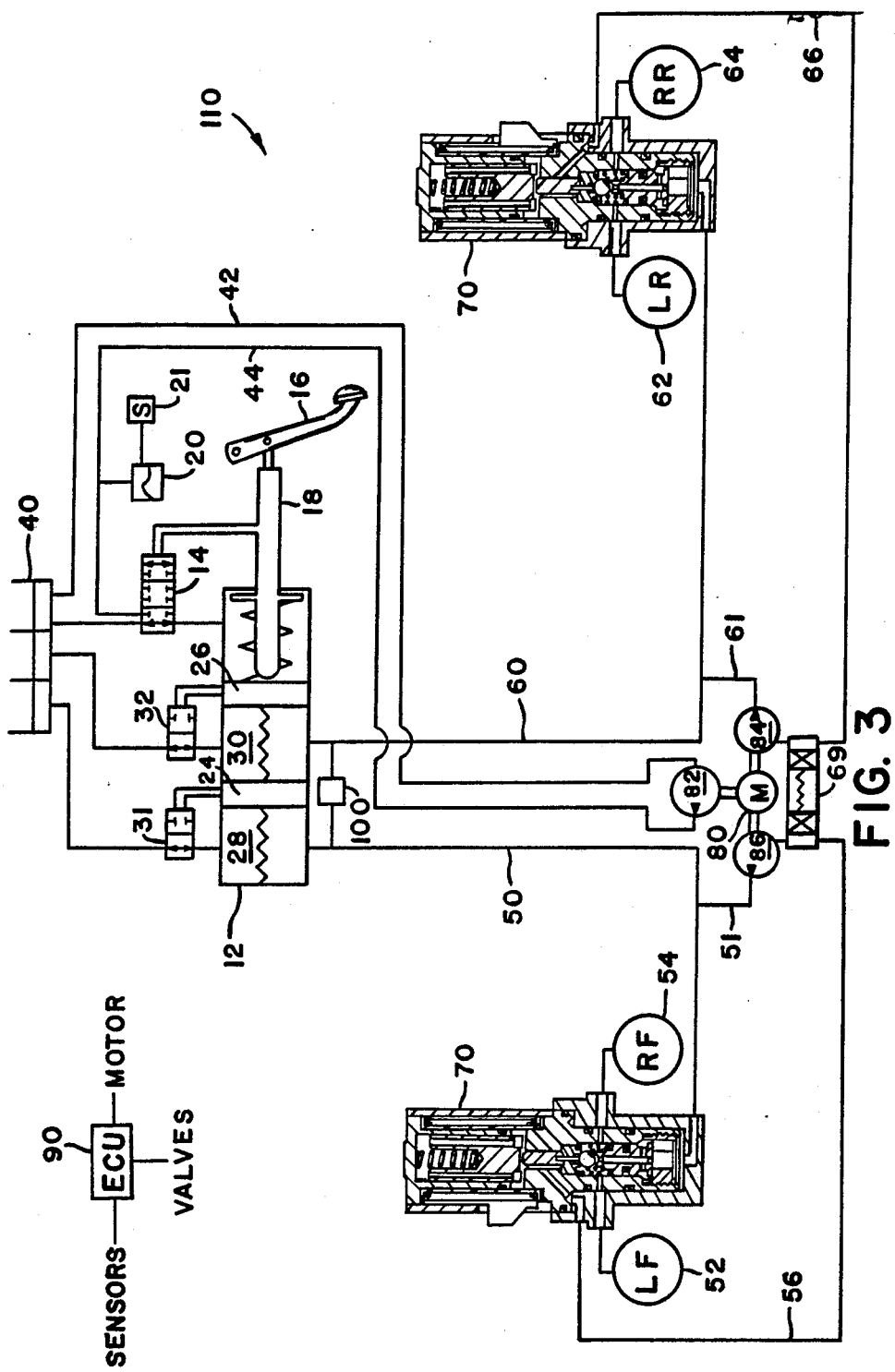
Figure 4:
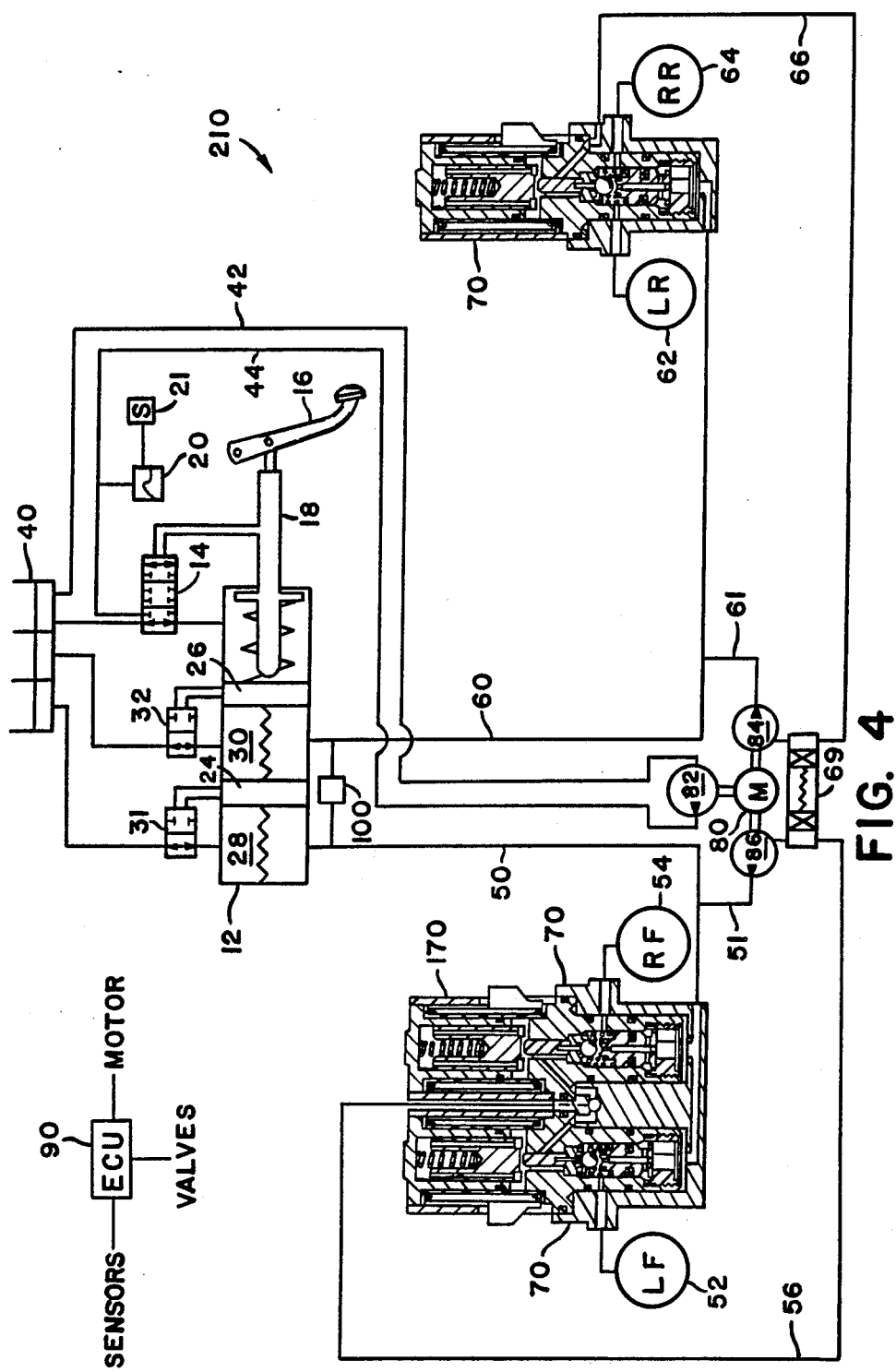
Figure 5:
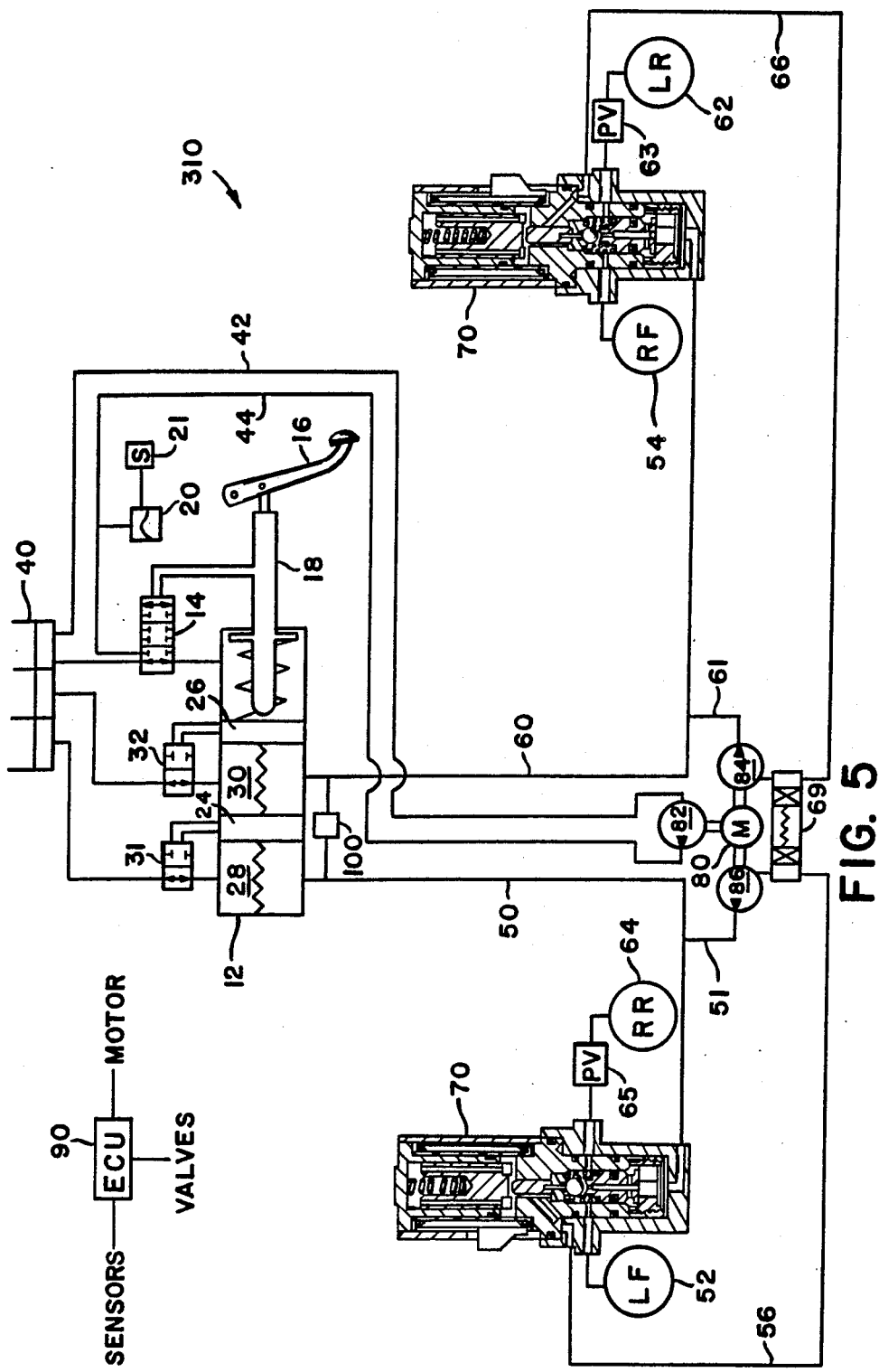
Figure 6:
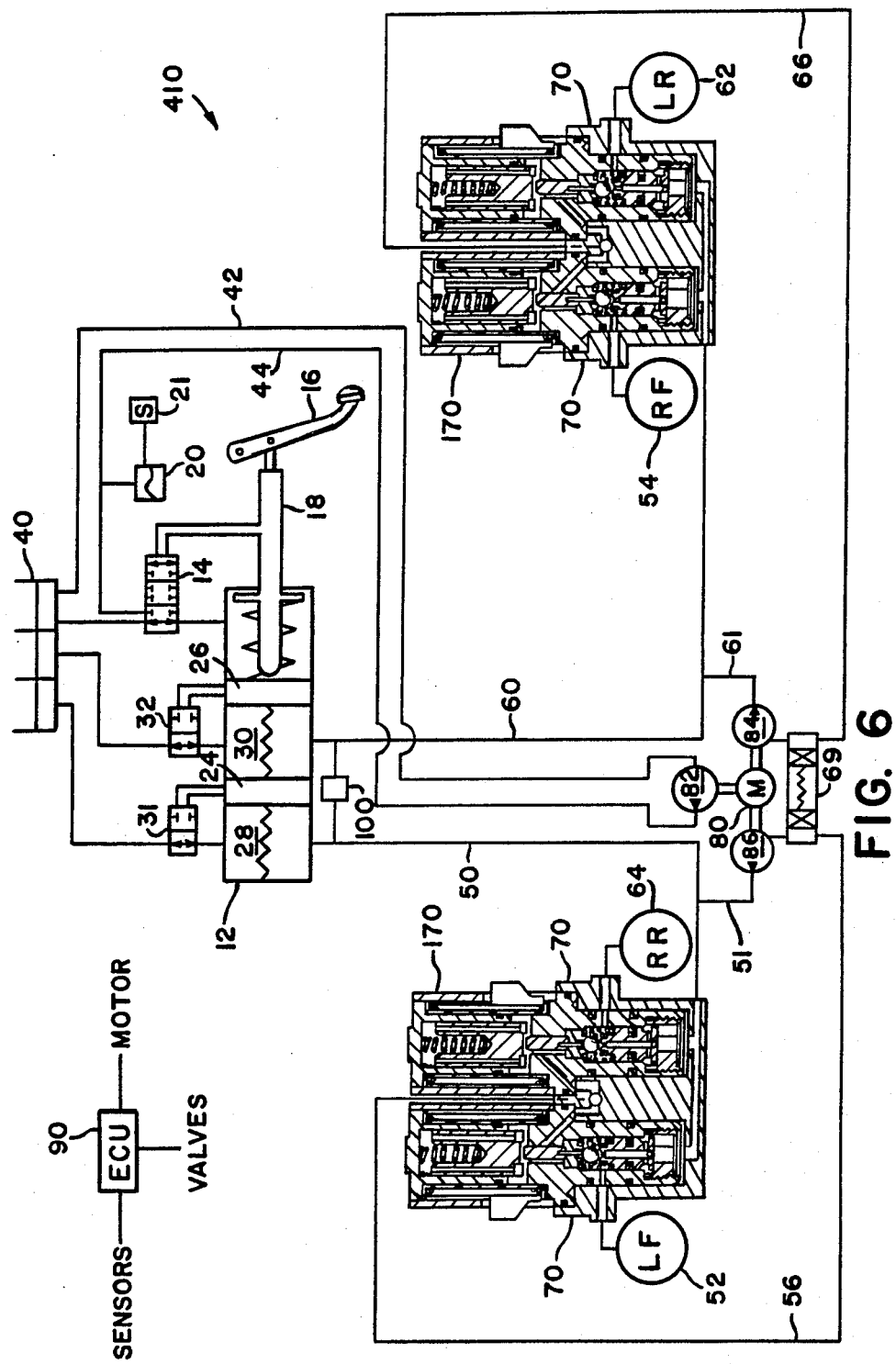

The invention is described in detail below with reference to the drawings which illustrate several embodiments, in which:

FIG. 1 is a schematic illustration of a single channel, axle-by-axle split system;
FIG. 2 is a section view of an electrically actuated valve mechanism that may be utilized in the present invention;
FIG. 3 is a schematic illustration of a two-channel, axle-by-axle split system;
FIG. 4 is a schematic illustration of a three-channel, axle-by-axle split system;
FIG. 5 is a schematic illustration of a two-channel, cross-split system; and
FIG. 6 is a schematic illustration of a four-channel, cross-split system.

The basic adaptive braking system of the present invention is indicated generally by reference numeral 10 in FIG. 1. Each of the adaptive braking systems disclosed herein is controlled by an electronic control unit 90 which receives signals from wheel speed sensors (not shown) and controls the operation of electrically actuated valve means 70 and pump motor 80. System 10 comprises a "full-power" type of hydraulic brake booster 12 which typically includes a valving mechanism 14 that is actuated when the vehicle operator depresses the brake pedal 16 and input rod 18. The valving mechanism 14 operates to permit fluid pressure from accumulator 20 to communicate with the booster and provide a power assist to the pistons 24 and 26, which effects the development of brake pressure in chambers 28 and 30. Each chamber 28 and 30 can communicate with a reservoir 40 via respective compensation valves 31 and 32. The full-power hydraulic brake booster 12 may comprise the brake booster illustrated in Brown et al. U.S. Pat. No. 4,514,981 incorporated by reference herein, or may comprise any other suitable type of hydraulic brake booster which performs the same brake boosting function. The first chamber 28 provides braking pressure via line 50 to the front brakes 52 and 54. The second chamber 30 provides fluid pressure via brake line 60 to the rear brakes 62 and 64 via electrically actuated valve means 70. Lines 50 and 60 are connected to a pressure differential warning switch 100. Electrically actuated valve means 70 comprises a single electrically actuated valve which has two openings so that fluid pressure communication to both of the rear brakes can be controlled. Electrically actuated valve means 70 may comprise the integrated three-way and isolation solenoid valve illustrated in Brown U.S. Pat. No. 4,620,565 incorporated by reference herein, or any other electrically actuated valve means which provides the same operational functions. System 10 includes pump means 80 which includes pump section 82 that receives fluid from reservoir 40 via line 42 and communicates fluid pressure via line 44 to valving mechanism 14 via accumulator 20 controlled by pressure switch 21. The pressure switch 21 operates to actuate the pump as necessary in order to maintain fluid pressure in accumulator 20 within a predetermined fluid pressure range. Pump means 80 includes a second pump section 84 which communicates fluid pressure via line 61 to line 60 and electrically actuated valve means 70. Pump section 84 receives fluid via decay return line 66 and sump means 68.

FIG. 2 illustrates in section view of the integrated three-way and isolation solenoid valve 70 provided in accordance with the valve disclosed in Brown U.S. Pat. No. 4,620,565. Solenoid valve means 70 connects with brake line 60 communicating fluid pressure from hydraulic booster 12 and pump means 80, so that fluid pressure enters the bottom chamber 72 and proceeds through the bore 74 of valve element 73, into chamber 75 and through the outlets 76 to the brakes 62 and 64. Valve means 70 includes coils 77 which operate a plunger 78 that acts upon ball valve 79. Ball valve 79 is biased by spring 90 into engagement with seat 91. Valve element 73 is biased by spring 92 toward the chamber 72. Element 73 includes a valve seat 93. When valve means 70 is operating in the decay mode, the coils 77 are energized and plunger 78 moves downwardly to display ball valve 79 into sealing engagement with valve seat 93 so that fluid pressure in the brakes may proceed from outlets 76 through chamber 75, past seat 91 and plunger 78 to outlet 94 which communicates with decay return line 66. When valve means 70 operates in the build mode, a fluid pressure differential causes valve element 73 to move upwardly against the biasing force of the springs so that fluid pressure is communicated through chamber 72, bleed port 95, opening 74, past narrowly open valve seat 93, and to outlets 76 and brakes 62 and 64. Electrically actuated valve means 70 operates as disclosed in Brown U.S. Pat. No. 4,620,565.

During normal braking, the booster 12 provides braking pressure via lines 50, 60 and valve means 70 to the respective brakes. When the electronic control unit senses, by means of wheel speed sensors (not shown), an incipient skidding condition, unit 90 actuates pump motor 80 and causes valve means 70 to operate in the decay mode in order to relieve brake pressure at wheel brakes 62, 64 and prevent wheel skidding, and then causes valve means 70 to operate in the build mode so that braking pressure is communicated to wheel brakes 62 and 64. Brake pressure is communicated away from valve means 70 via decay return line 66 and then "pumped back" to valve means 70 via lines 61 and 60 for use during build mode operation. The control unit 90 operates the valve means 70 many times each second in order to maximize braking and steerability while preventing skidding.

FIG. 3 illustrates an adaptive braking system similar to that disclosed in FIG. 1, but which further includes a second electrically actuated valve means for the brakes of the front axle of the vehicle. Similar structure will be indicated by the same numbers as used previously. Adaptive braking system 110 includes the second electrically actuated valve means 70 which controls the communication of fluid pressure to the front brakes 52 and 54. The circuits are essentially the same as described above for system 10 of FIG. 1, except that there is an additional valve means 70 and pump means 80 includes a third pumping section 86 which communicates fluid pressure via line 51 to line 50, valve means 70, and front brakes 52, 54. A decay return line 56 permits fluid to be communicated to pumping section 86 via dual sump means 69. Because two electrically actuated valve means 70 are present, there is a provided a two-channel adaptive braking system for controlling the wheel brakes of the respective axles.

FIG. 4 illustrates a three-channel axle-by-axle adaptive braking system 210. Similar structure will be indicated by the same numerals utilized above. System 210 is essentially identical to the adaptive braking system 110 of FIG. 3, except that the first braking circuit which provides hydraulic fluid pressure to the front brakes 52 and 54 includes a dual valve device 170. Dual valve device 170 includes two valve means 70 each controlling the communication of fluid pressure to a respective brake of the front axle. Dual valve device 170 includes the decay line 56 which returns fluid pressure to the pump section 86 via dual sump 69. Adaptive braking system 210 comprises a three-channel system because device 170 controls separately the communication of fluid pressure to each of the brakes of the front axle and valve 70 of the second circuit controls jointly the communication of fluid pressure to both brakes of the rear axle.

FIG. 5 illustrates schematically an adaptive braking system 310 which provides a two-channel, cross-split system. The two-channel, cross-split system comprises a pair of electrically actuated valve means 70 which receive, during normal braking, fluid pressure from the respective chambers of the hydraulic booster 12. Each valve means 70 includes a pair of outlets which are connected with a pair of diagonally split brakes on opposite axles. For example, the electrically actuated valve means 70 of the second circuit including line 60 controls the communication of fluid pressure to right front brake 54 and left rear brake 62. Left rear brake 62 receives fluid pressure via a proportioning valve 63. The first braking circuit communicates fluid pressure via line 50 to the associated electrically actuated valve means 70 which provides fluid pressure to the left front brake 52 and right rear brake 64, the right rear brake 64 receiving fluid pressure via a proportioning valve 65. Each of the valve means 70 includes a respective decay return line 56, 66 which communicates with the pump means 80 via the dual sump means 69. Adaptive braking system 310 comprises a two-channel, cross-split system because there is provided two electrically actuated valve means 70 connected to diagonally opposite wheel brakes on opposite axles.

FIG. 6 illustrates an adaptive braking system 410 which is similar to that disclosed in FIG. 5, but which comprises a four-channel, cross-split system that includes dual valve devices 170 disposed within each of the braking circuits. The first braking circuit communicates fluid pressure from first chamber 28 through line 50 to the dual valve device 170, dual valve device 170 including a pair of valve means 70 each of which can control the communication of fluid pressure to a respective wheel brake. The wheel brakes comprise left front brake 52 and right rear brake 64. Likewise, a dual valve device 170 receiving fluid pressure via line 60 from second chamber 30 includes two valve means 70 each of which controls the communication of fluid pressure to a respective wheel brake, the wheel brakes comprising right front wheel brake 54 and left rear brake 62. Each device 170 is connected with a respective decay return line 56, 66 which communicates with the dual sump device 69. Because each of the wheel brakes can be controlled separately via a respective valve means 70, system 410 comprises a four-channel, cross-split system.

By providing the combination of a replenishment-type full-power hydraulic brake booster which receives its pressure from a pump via an accumulator, in combination with a pump-back system wherein the pump also provides make-up fluid pressure to the respective electrically actuated valve means which control the antilock communication of fluid pressure to the respective brakes, the present invention provides substantial advantages over prior systems. A full family of adaptive braking systems can be provided which handle both cross-split and axle-by-axle systems with one to four channels. The systems can be provided as either add-on units or fully integrated firewall mounted units. Each of these systems, whether it has one to four channels or either one of the axle-by-axle or cross-split systems, can be provided with minimal modification of the basic adaptive braking system disclosed herein.

While the invention has been described with respect to the detailed embodiments, it will be understood that the invention is capable of numerous rearrangements, modifications, and alterations, and such are intended to be within the scope of the appended claims.

I claim:

1. An adaptive braking system for a vehicle having a pair of axles with a pair of wheels and brakes on each axle, said system including a hydraulic brake booster for actuation by a vehicle operator, said hydraulic brake booster having first and second chambers in which hydraulic braking pressure is developed when a brake application is effected by the vehicle operator, a first braking circuit hydraulically communicating said first chamber with at least one brake controlling a wheel on one of said axles, a second braking circuit hydraulically communicating said second chamber with at least one brake controlling a wheel of the other axle, first electrically actuated valve means in said second braking circuit and for controlling hydraulic communication with the respective brake, control means responsive to rotation of the wheels and for controlling said one brake of the other axle by operating said electrically actuated valve means when an incipient skidding condition is detected, and pump means which supplies hydraulic pressure both to said booster for normal braking and to said one brake of the other axle when control of the one brake is effected by said control means in response to said incipient skidding conditions, hydraulic pressure being decayed away from the one brake and communicated directly to the pump means for return to the one brake during said incipient skidding condition, the direct communication to the pump means including communication with sump means that is separate from any reservoir means for said booster.

2. The adaptive braking system in accordance with claim 1, wherein the electrically actuated valve means comprises a single electronic valve which controls hydraulic communication with both brakes of the other axle.

3. The adaptive braking system in accordance with claim 1, wherein said electrically actuated valve means includes a decay line which communicates hydraulic pressure from said one brake of the other axle to sump means which is connected with said pump means.

4. The adaptive braking system in accordance with claim 1, wherein said pump means includes a pumping section which receives hydraulic fluid from a reservoir and communicates fluid pressure to said hydraulic booster via accumulator means.

5. The adaptive braking system in accordance with claim 1, further comprising second electrically actuated valve means disposed within said first braking circuit and for controlling hydraulic communication with the respective brake, the pump means supplying make-up pressure to said one brake of the one axle.

6. The adaptive braking system in accordance with claim 5, wherein said first and second electrically actuated valve means comprise single valves which control hydraulic communication with the brake of the respective axle.

7. The adaptive braking system in accordance with claim 6, wherein each electrically actuated valve means communciates with both brakes of the respective axle.

8. The adaptive braking system in accordance with claim 7, wherein the electrically actuated valve means of the first braking circuit includes a decay return line which communicates hydraulic fluid pressure from the brakes of the one axle to the pump means via sump means.

9. The adaptive braking system in accordance with claim 8, wherein the sump means is disposed within decay return lines from each of said valve means to the pump means.

10. The adaptive braking system in accordance with claim 5, wherein said second electrically actuated valve means of the first braking circuit comprises a dual valve device with each valve thereof communicating with a respective brake of the one axle.

11. The adaptive braking system in accordance with claim 10, wherein the first and second electrically actuated valve means each include a decay return line which communicates fluid pressure to the pump means via sump means.

12. The adaptive braking system in accordance with claim 5, wherein each of the electrically actuated valve means communicates fluid pressure to brakes on opposite axles.

13. The adaptive braking system in accordance with claim 12, wherein each of the electrically actuated valve means controls the communication of fluid pressure to an associated brake of the other axle via proportioning valve means.

14. The adaptive braking system in accordance with claim 13, wherein each of the electrically actuated valve means includes a decay return line communicating fluid pressure to the pump means via sump means.

15. The adaptive braking system in accordance with claim 12, wherein each of the electrically actuated valve means comprises dual valve devices with each valve of the respective dual valve device communicating with a respective brake.

* * * * *